US010114901B2

(12) United States Patent
Mitrovic

(10) Patent No.: US 10,114,901 B2
(45) Date of Patent: Oct. 30, 2018

(54) SYSTEMS AND METHODS FOR REAL-TIME LOCATION-AWARE RECOMMENDATIONS

(75) Inventor: Ivan Mitrovic, Charlestown, MA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/554,584

(22) Filed: Jul. 20, 2012

(65) Prior Publication Data
US 2013/0024471 A1 Jan. 24, 2013

Related U.S. Application Data

(60) Provisional application No. 61/509,987, filed on Jul. 20, 2011.

(51) Int. Cl.
G06F 17/30 (2006.01)

(52) U.S. Cl.
CPC .... *G06F 17/3087* (2013.01); *G06F 17/30867* (2013.01)

(58) Field of Classification Search
None
See application file for complete search history.

(56) References Cited

U.S. PATENT DOCUMENTS

| 2003/0100315 | A1 | 5/2003 | Rankin | |
| 2006/0200432 | A1 | 9/2006 | Flinn et al. | |
| 2006/0271569 | A1* | 11/2006 | Fong | G06Q 10/00 |
| 2007/0027925 | A1* | 2/2007 | Spencer | G06F 17/3087 |
| 2007/0282621 | A1 | 12/2007 | Altman et al. | |
| 2008/0091722 | A1* | 4/2008 | Wendelrup | 707/104.1 |
| 2008/0104024 | A1* | 5/2008 | Kumar | G06F 17/30991 |
| 2008/0120339 | A1* | 5/2008 | Guan | G06Q 10/10 |
| 2010/0076968 | A1* | 3/2010 | Boyns | G06F 17/30241 707/732 |
| 2010/0306185 | A1* | 12/2010 | Smith | G06Q 10/107 707/709 |
| 2011/0010364 | A1* | 1/2011 | Ahtisaari et al. | 707/724 |
| 2011/0184945 | A1 | 7/2011 | Das et al. | |
| 2011/0276565 | A1* | 11/2011 | Zheng | G01C 21/20 707/724 |

(Continued)

FOREIGN PATENT DOCUMENTS

| CN | 102047249 A | 5/2011 |
| CN | 103814599 A | 5/2014 |

(Continued)

OTHER PUBLICATIONS

"International Application serial No. PCT/US2012/047621, Search Report dated Sep. 20, 2012", 2 pgs.

(Continued)

*Primary Examiner* — Christopher J Raab
(74) *Attorney, Agent, or Firm* — Wolfe-SBMC

(57) ABSTRACT

Systems and methods for real-time location-aware recommendations are discussed herein. In an example, a method for generating location-aware recommendations can include receiving a current location of a user, calculating a place graph for the user, traversing the place graph, selecting a recommendation, and communicating the recommendation. In this example, the place graph is calculated based on the current location. Traversing the place graph can identify one or more potential recommendations within a pre-defined distance of the current location.

7 Claims, 10 Drawing Sheets

(56) References Cited

U.S. PATENT DOCUMENTS

| | | | |
|---|---|---|---|
| 2011/0307478 A1* | 12/2011 | Pinckney et al. | 707/724 |
| 2012/0124059 A1* | 5/2012 | Pratt | G06Q 10/107 |
| | | | 707/748 |
| 2012/0136855 A1* | 5/2012 | Ni et al. | 707/724 |
| 2012/0233158 A1* | 9/2012 | Braginsky et al. | 707/724 |
| 2012/0254917 A1* | 10/2012 | Burkitt et al. | 725/40 |
| 2013/0097162 A1* | 4/2013 | Corcoran et al. | 707/724 |

FOREIGN PATENT DOCUMENTS

| | | |
|---|---|---|
| JP | 2005065117 A | 3/2005 |
| KR | 100897436 B1 | 5/2009 |
| WO | WO-2009151928 A2 | 12/2009 |
| WO | WO-2013013161 A1 | 1/2013 |

OTHER PUBLICATIONS

"International Application serial No. PCT/US2012/047621, Written Opinion dated Sep. 20, 2012", 4 pgs.
"European Application Serial No. 12814675.0, Office Action dated Mar. 5, 2014", 4 pgs.
"International Application Serial No. PCT/US2012/047621, International Preliminary Report on Patentability dated Jan. 30, 2014", 6 pgs.
"Australian Application Serial No. 2012283826, First Examiner Report dated Oct. 21, 2014", 3 pgs.
"Canadian Application Serial No. 2,842,265, Office Action dated May 26, 2015", 3 pgs.
"Canadian Application Serial No. 2,842,265, Response filed Nov. 25, 2015 to Office Action dated May 26, 2015", 12 pgs.
"European Application Serial No. 12814675.0, Extended European Search Report dated Oct. 29, 2015", 8 pgs.
"Korean Application Serial No. 2014-7004287, Office Action dated Mar. 13, 2015", not in English, 4 pgs.
"Korean Application Serial No. 2014-7004287, Response filed Aug. 13, 2015 to Office Action dated Mar. 13, 2015", w/ English Claims, 23 pgs.
"Korean Application Serial No. 2015/7022008, Office Action dated Sep. 8, 2015", w/ English Translation, 5 pgs.
"Korean Application Serial No, 2015-7022008, Response filed Dec. 7, 2015 to Office Action dated Sep. 8, 2015", w/ English Claims, 13 pgs.
"Australian Application Serial No. 2015238908, First Examiner Report dated Apr. 12, 2016", 2 pgs.
"Australian Application Serial No. 2015238908, Office Action dated Feb. 1, 2016", 1 pgs.
"Canadian Application Serial No. 2,842,265, Office Action dated Jun. 1, 2016", 4 pgs.
"Canadian Application Serial No. 2,842,265, Office Action dated Apr. 21, 2017", 4 pgs.
"Chinese Application Serial No. 201280045362.1, Office Action Response dated Mar. 28, 2017", 23 pags.
"Chinese Application Serial No. 201280045362.1, Office Action dated Jul. 3, 2017", w/English Translation, 6 pgs.
"European Application Serial No. 12814675.0, Office Action dated Jun. 27, 2017", 6 pgs.
Response to Office Action filed on Oct. 24, 2017 for European Patent Application No. 12814675.0, dated Jun. 27, 2017, 4 pages.
Office Action received for Canadian Patent Application No. 2,842,265, dated Mar. 12, 2018, 4 pages.
Response to Office Action filed on Oct. 16, 2017 for Canadian Patent Application No. 2,842,265, dated Apr. 21, 2017, 9 pages.
Office Action received for Chinese Patent Application No. 201280045362.1, dated Jan. 2, 2018, 24 pages.
Response to Office Action filed on Mar. 14, 2018 for Chinese Patent Application No. 201280045362.1, dated Jan. 2, 2018, 17 pages (12 pages of Official Copy and 5 pages of English Claims).
Response to Office Action filed on Sep. 14, 2017 for Chinese Patent Application No. 201280045362.1, dated Jul. 3, 2017, 15 pages (10 pages of Official Copy and 5 pages of English Claims).
Summons to Attend Oral Proceedings received for European Patent Application No. 12814675.0, dated Apr. 19, 2018, 11 pages.
Response to Office Action filed on Jun. 15, 2015 for Australian Patent Application No. 2012283826, dated Oct. 21, 2014, 21 pages.
"Australian Application Serial No. 2015238908, Response filed Aug. 11, 2016 to First Examiner Report dated Apr. 12, 2016", 7 pgs.
"Canadian Application Serial No. 2,842,265, Response filed Nov. 28, 2016 to Office Action dated Jun. 1, 2016", 25 pgs.
"Chinese Application Serial No. 201280045362.1, Office Action dated Nov. 3, 2016", w/ English Translation, 19 pgs.
Response to Office Action filed on Sep. 12, 2018, for Canada Patent Application No. 2,842,265, dated Mar. 12, 2018, 9 pages.

* cited by examiner

| VENUE | FEATURES | | | | | | | | | | |
|---|---|---|---|---|---|---|---|---|---|---|---|
| | 1 | 2 | 3 | 4 | 5 | 6 | 7 | 8 | 9 | 10 | ... | N |
| PLACE 1 | 0.23 | -0.4 | 0.3 | 0.01 | 0.8 | 0.4 | 0.45 | 0.2 | 0.9 | -0.3 | | 0.5 |
| PLACE 2 | 0.3 | 0.09 | 0.12 | -0.6 | 0.76 | 0.2 | -0.7 | 0.7 | 0.3 | -0.7 | | 0.9 |
| PLACE 3 | -0.6 | 0.6 | 0.3 | 0.69 | 0.2 | -0.87 | 0.65 | 0.5 | -0.7 | 0.3 | | 0.12 |
| ... | | | | | | | | | | | | |
| PLACE N | -0.98 | 0.12 | 0.43 | 0.76 | 0.49 | 0.27 | -0.076 | 0.79 | 0.31 | 0.16 | | 0.63 |

*FIG. 9*

SYSTEMS AND METHODS FOR REAL-TIME LOCATION-AWARE RECOMMENDATIONS

CLAIM OF PRIORITY

This application claims the benefit of priority under 35 U.S.C. § 119(e) of Mitrovic, U.S. Provisional Patent Application Ser. No. 61/509,987, entitled "SYSTEMS AND METHODS FOR REAL-TIME LOCATION-AWARE RECOMMENDATIONS", filed on Jul. 20, 2011, which is herein incorporated by reference in its entirety.

TECHNICAL FIELD

This application relates generally to data processing within a network-based recommendation system operating over a distributed network, and more specifically to systems and methods for making location-aware recommendations based on user profile data and location information.

BACKGROUND

The explosion of information available over network-based systems, such as the Internet can overwhelm a person attempting to locate a desired piece of information or product. For example, a person looking for a place to eat or a local entertainment event can search the Internet, but is likely to either be overwhelmed by the volume of data or unable to locate any relevant information. The dramatic growth in the amount of information available via the Internet has left users with the problem of sorting and browsing through enormous amounts of data to find information relevant to their needs. Targeted search services and recommendation engines have been implemented to attempt to assist users in locating relevant information or products. A successful recommendation system not only saves users time in locating relevant information (e.g., a place to eat or product to purchase) but can also drive extra profits through advertising or additional sales revenue for the service provider operating the search service or recommendation engine.

The advent of Internet connected smartphones, such as the iPhone™ (from Apple, Inc. of Cupertino, Calif.), has compounded the problem by making the vast amounts of information available via the Internet available anywhere. Smartphones also typically have location determination capabilities, adding to the available data for use by a search or recommendation engine. However, providing real-time location-aware recommendations presents significant challenges.

Traditional recommendation systems use some form of collaborative filtering to reduce the volume of information found through simple keyword or natural language searching. Two different basic types of collaborative filtering are typically employed by recommendation systems, user-based or item-based (or target-based). User-based collaborative filtering focuses on grouping like user behavior. Item-based recommendation systems focus on grouping similar items. Item-based recommendations using collaborative filtering can be used by commerce sites to provide recommendations based on the purchase history of users who bought similar products (e.g., users who bought X also bought Y and Z). Item-based recommendations can also be applied to things like restaurants or entertainment venues. However, collaborative filtering is limited, especially when location is added to the recommendation matrix.

BRIEF DESCRIPTION OF THE DRAWINGS

Some embodiments are illustrated by way of example and not limitation in the figures of the accompanying drawings in which:

FIG. 9 is a table illustrating a set of features for venues within a geographical location, according to an example embodiment.

DEFINITIONS

Figure 1:
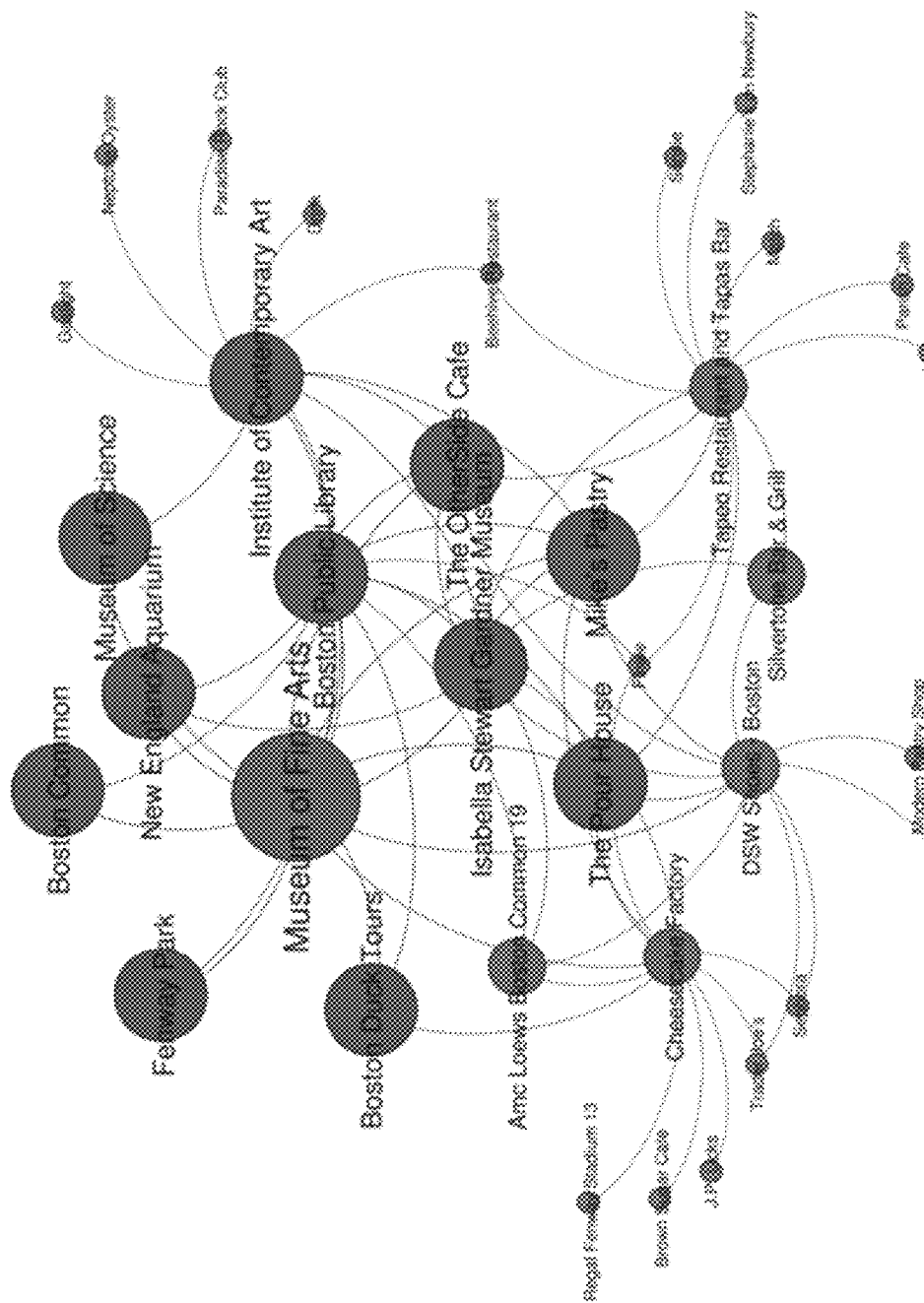
FIG. 1 is a relationship diagram illustrating a simple place graph, according to an example embodiment.

Place or Venue—For the purposes of this specification and the associated claims the terms "place" and "venue" are used interchangeably to reference physical locations, such as a restaurant, theater, stadium, or place of business, among others. A place or venue will have various attributes or features, such as a physical location, category, and hours of operation, among others. The place or venue can also be categorized into multiple different categories, such as restaurant or Italian restaurant.

Location—For the purposes of this specification and the associated claims the term "location" is used to refer to a geographic location, such as a longitude/latitude combination or a street address.

Real-time—For the purposes of this specification and the associated claims the term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine.

DETAILED DESCRIPTION

Example systems and methods for providing real-time location-aware recommendations are described. The systems and methods for providing real-time location-aware recommendations, in some example embodiments may provide recommendations based on past behavior of a user interacting with a network-based system, such as a network-based location-aware recommendation system. In the following description, for purposes of explanation, numerous specific details are set forth in order to provide a thorough understanding of example embodiments. It will be evident, however, to one skilled in the art that the present invention may be practiced without these specific details. It will also be evident that real-time location-aware recommendations are not limited to the examples provided and may include other scenarios not specifically discussed.

In accordance with an example embodiment, a network-based system can provide recommendations based on a user's current location that leverage past user interactions with the network-based system. In some examples, the user interacts with the network-based system via a mobile device, such as a smartphone, a tablet computing device, or Internet enabled personal digital assistant (PDA), among others. In an example, the network-based system can include a recommendation sub-system capable of deriving location-aware recommendations and communicating the recommendations to a user's mobile device in near real-time. Producing real-time location-aware recommendations requires on-the-fly calculations, as pre-programmed (pre-compiled) recommendations are not effective when both user profile data (e.g., preferences as well as explicit and implicit behaviors) and location data are used to generate the recommendations.

In a traditional collaborative filtering recommendation system, such as might be used to recommend movies (e.g., movie recommendations on NETFLIX.COM from Netflix, Inc. of Los Gatos, Calif.), the recommendation system can use viewing history from multiple people across multiple geographies to develop pre-compiled recommendations. The location of the viewer is either irrelevant or at best only very broadly applicable to the recommendations. Additionally, as will be discussed in more detail below, the recommendation engine can have many more inputs available, as people generally view movies more often than they visit local points of interest (e.g., restaurant or entertainment venue).

In contrast, location-aware recommendation engines often may have far fewer inputs to work with in generating a recommendation. Users typically only visit local establishments a couple times a week and also tend to visit the same locations more frequently. Thus, the location-aware recommendation engine may benefit from using algorithms that go beyond simple collaborative filtering. In an example embodiment, a location-aware recommendation system can generate a graph of places, referred to herein as a place graph, to enable personalized recommendations and new discoveries. The place graph contains physical locations as nodes interconnected by inherent or user specific relationships (also referred to as features). FIG. 1 is a relationship diagram or graph illustrating a simple place graph for a specific user at a specific geographic location.

According to an example, a place graph can be generated from multiple inputs, including general information about the physical locations and user inputs. The general information about the physical locations can include location (e.g., longitude/latitude, street address, etc.) category (e.g., restaurant, bar, etc.), and reviews, among other things. The user inputs can include both implicit and explicit interactions with physical locations. The recommendation system can then use machine learning, similarity metrics, and predictive analytics to generate a place graph for a particular user in a particular location. The algorithms used by the recommendation system allow for real-time projection of a user's implicit and explicit interactions in one location to be projected onto a new location to produce recommendations relevant to both the user's demonstrated interests and the venues (e.g., restaurants, entertainment events, etc . . . ) available in the new location. In an example, projection of a user's implicit and explicit interactions in one location to a new location includes filtering places in the new location through a spatial filtering mechanism (e.g., center point and radius).

The inputs used in certain example embodiments can include three general buckets: explicit interactions, implicit interactions, and place (location) information. Explicit interactions can include ratings, reviews, check-ins, saving places into an address book, or another explicit action taken by a user that can be positively interpreted to indicate a preference regarding a venue. Explicit interactions are inputs from users that directly reveal the users preferences and choices. Implicit interactions are passive by products of searching, browsing, or interacting with a mobile application. For example, an implicit interaction can be recorded when a user clicks on an online detail page of a local venue. Merely clicking on a detail page for a venue does not positively identify the user's intent regarding the venue. In some cases the user may read the detail page and decide that they do not like the venue (or are unlikely to like the venue). The recommendation system may infer some interest in a venue based on a user's implicit interactions, but these implicit interactions can be handled differently from explicit interactions by the recommendation system. Finally, the recommendation system uses place or venue information as an input to calculating a place graph.

Figure 2:
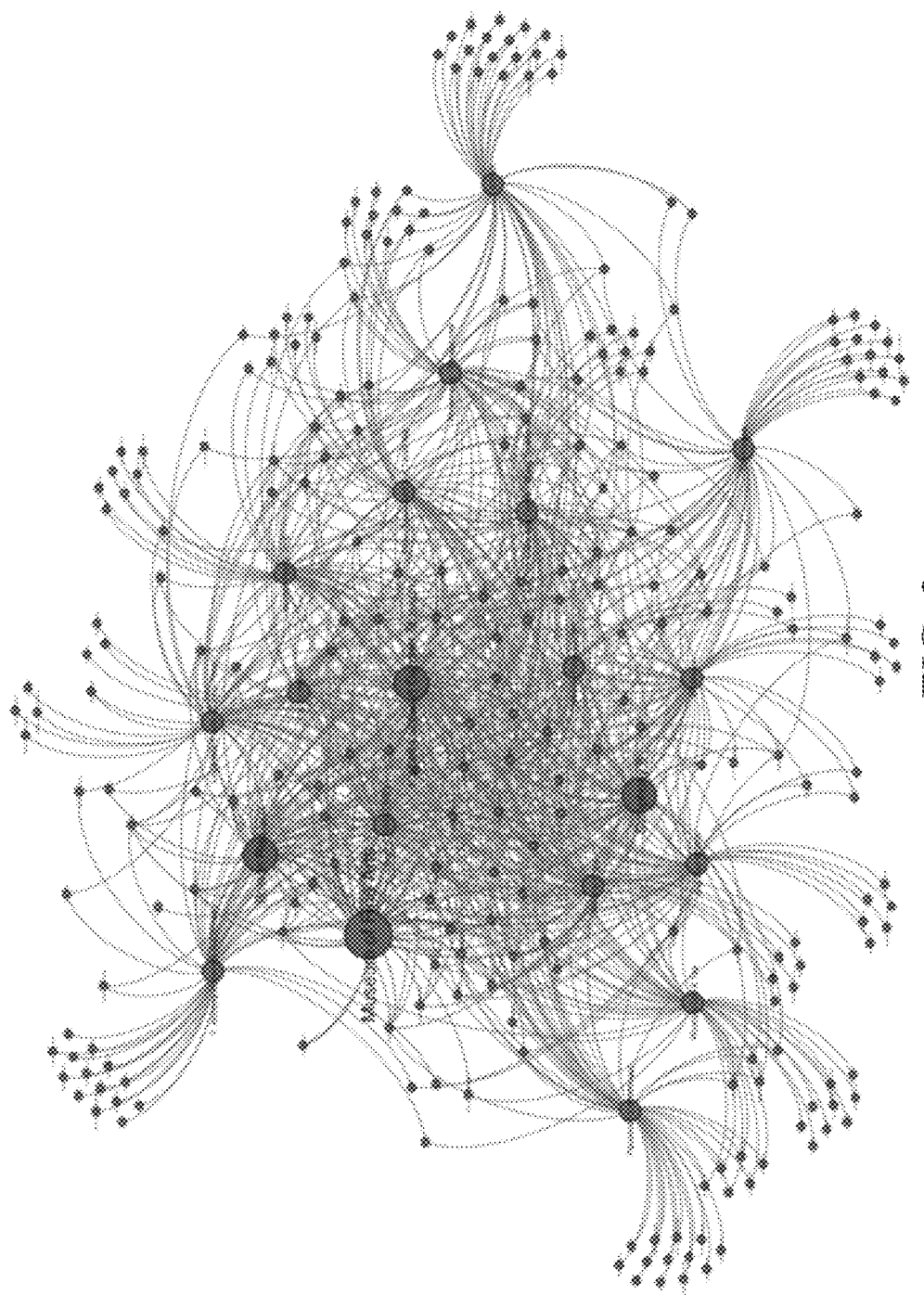
FIG. 2 is a relationship diagram illustrating a more detailed place graph, according to an example embodiment.

In an example, the recommendation system uses specialized indexing and retrieval algorithms that leverage mathematical techniques and machine learning to identify patterns and relationships for venues based on the inputs described above. Given the inputs discussed above, the dynamically generated output consists of multiple levels of relationships of places for a particular user. FIG. 2 is a relationship diagram illustrating a more detailed place graph, according to an example embodiment.

As illustrated by the place graph examples illustrated in FIG. 1 and FIG. 2, local places with similar features often end up related in a place graph (e.g., some sushi place will likely have other sushi places in the graph). In an example, the recommendation system uses algorithms, such as principal component analysis (PCA) and/or singular value decomposition (SVD), to extract features across a set of locations within a geographical area. This machine based feature extraction can identify similarities between locations that are not readily apparent to users. For example, an extracted similarity feature might be something like "restaurants that service expensive food downtown and have award winning deserts." The features are often so arcane that it requires careful re-construction analyzing two machine related locations to determine how the shared feature was developed. Thus, in these examples, this relationship (represented by the shared feature) is inferred not implied—meaning these are the results of the mathematical algorithms that have been computed/inferred, and not directly or heuristically implied. In this example, dimensionality reduction can be applied to further the concept of inferring relationships between places (e.g., venues). These techniques enable an example recommendation engine to develop previously unknown connections among places, allowing for new personalized discoveries to be presented to users as recommendations.

As mentioned above, explicit and implicit user interactions can be treated differently by the recommendation engine in developing a place graph. Although there sometimes appears to be a high correlation between implicit and explicit actions—between places that have been browsed and have been rated by a user—attempts to model explicit interactions from implicit interactions generally produces lower quality recommendations. In an example, the quality of a recommendation can be measured by whether the user acts upon a recommendation (either explicitly or implicitly). For example, historical user interaction data demonstrates that trying to predict a user's rating for a particular place based on the number of times that user has viewed the detailed page of that place has not proven reliable. While hybrid models can be applied, most example embodiments use probabilistic similarity metrics to calculate relationships among places in a certain geographic area e.g., neighborhood, city, or metro area).

Generating a personalized place graph can be a difficult undertaking. As mentioned above, user-place interactions are generally sparse and extremely sparse (or non-existent) in new geographical locations. To address the sparse data issue, the recommendation system can use dimensionality reduction and matrix factorization. In an example system, dimensionality reduction and matrix factorization are performed using the PCA and SVD algorithms mentioned above. By factorizing an original user-place-interaction matrix, the system can uncover hidden connections among places in different geographic locations based on user profile data and successfully build a place graph for new geographic locations (e.g., geographic locations where the user has limited or no explicit or implicit interactions with local places). In certain examples, the recommendation system can also leverage more traditional collaborative filtering techniques, particularly when a user initially starts using the recommendation system (e.g., cold start).

In an example, the recommendation system can create location-aware recommendations for a new geographic location. Unlike recommending movies, where a system can pre-compute the recommendation "lookup table" offline, a location-aware recommendation system must handle the local context and real-time response requirements imposed by modern mobile devices. As users move around with their mobile devices going to different places throughout the day, users demand that recommendations be constantly and dynamically recalculated according to the places around them (e.g., current geographic location) as well as other factors such as time of day. Periodically calculating recommendations offline is not going to produce the results desired by mobile device users. Recommendation calculations need to be performed in real-time and with the user's current location in context.

In an example, the recommendation system can employ rapid place graph node traversal to solve the real-time location-aware recommendation problem discussed above. The recommendation system discussed herein is capable of constantly recalculating user recommendations and updating a recommended place list based on a user's previous places (e.g., user profile data) and relative to the user's current location. As a result, the discussed recommendation system is an optimal solution for local discovery that takes mobile usability into account.

In an example, as users interact with places (nodes within a place graph), the explicit and implicit interactions are mapped on a place graph (e.g., nodes and edges are updated). Paths can then be calculated within the place graph that reflect the user's local tastes (e.g., likes and dislikes), the paths can be referred to as taste paths. Based on these taste paths, the system can predict places the user may like in the current location.

As noted above, the recommendation system can use a hybrid model that takes into account information beyond a place graph, such as user profile information and social graph (e.g., social network connections). This additional information can be especially useful in a cold start scenario, where a user has not recorded many (or any) interactions either explicit or implicit.

Example Operating Environment

Figure 3:
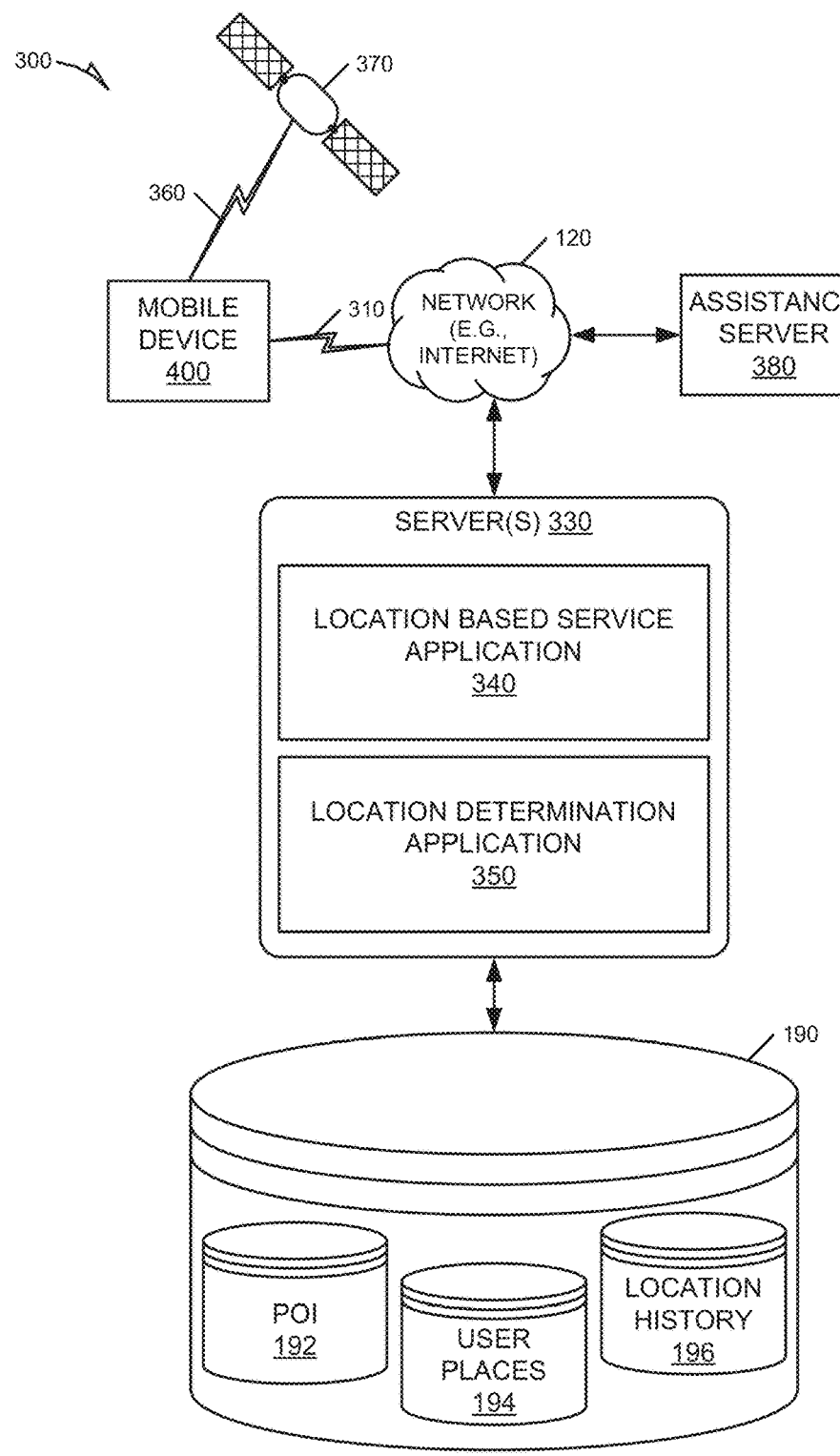
FIG. 3 is a block diagram illustrating an environment operating a mobile device, according to an example embodiment.

FIG. 3 is a block diagram illustrating an environment 300 for operating a mobile device 400, according to an example embodiment. The mobile electronic device 400 may be any of a variety of types of devices, for example a cellular telephone, a personal digital assistant (PDA), a Personal Navigation Device (PND), a handheld computer, a tablet computer, a notebook computer, or other type of movable device. The device 400 may interface via a connection 310 with a communication network 320. Depending on the form of the mobile electronic device 400, any of a variety of types of connections 310 and communication networks 320 may be used.

For example, the connection 310 may be Code Division Multiple Access (CDMA) connection, a Global System for Mobile communications (GSM) connection, or other type of cellular connection. Such connection 310 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology. When such technology is employed, the communication network 320 may include a cellular network that has a plurality of cell sites of overlapping geographic coverage, interconnected by cellular telephone exchanges. These cellular telephone exchanges may be coupled to a network backbone, for example, the public switched telephone network (PSTN), a packet-switched data network, or to other types of networks.

In another example, the connection 310 may be Wireless Fidelity (Wi-Fi, IEEE 802.11x type) connection, a Worldwide Interoperability for Microwave Access (WiMAX) connection, or another type of wireless data connection. In such an embodiment, the communication network 320 may include one or more wireless access points coupled to a local area network (LAN), a wide area network (WAN), the Internet, or other packet-switched data network.

In yet another example, the connection 310 may be a wired connection, for example an Ethernet link, and the communication network may be a local area network (LAN), a wide area network (WAN), the Internet, or other packet-switched data network. Accordingly, a variety of different configurations are expressly contemplated.

A plurality of servers 330 may be coupled via interfaces to the communication network 320, for example, via wired or wireless interfaces. These servers 330 may be configured to provide various types of services to the mobile electronic device 400. For example, one or more servers 130 may execute location based service (LBS) applications 340, which intemperate with software executing on the device 400, to provide LBS's to a user. LBS's can use knowledge of the device's location, and/or the location of other devices, to provide location-specific information, recommendations, notifications, interactive capabilities, and/or other functionality to a user. Knowledge of the device's location, and/or the location of other devices, may be obtained through interoperation of the device 400 with a location determination application 350 executing on one or more of the servers 330. Location information may also be provided by the device 400, without use of a location determination application, such as application 350. In certain examples, the device 400 may have some limited location determination capabilities that are augmented by the location determination application 350.

Example Mobile Device

Figure 4:
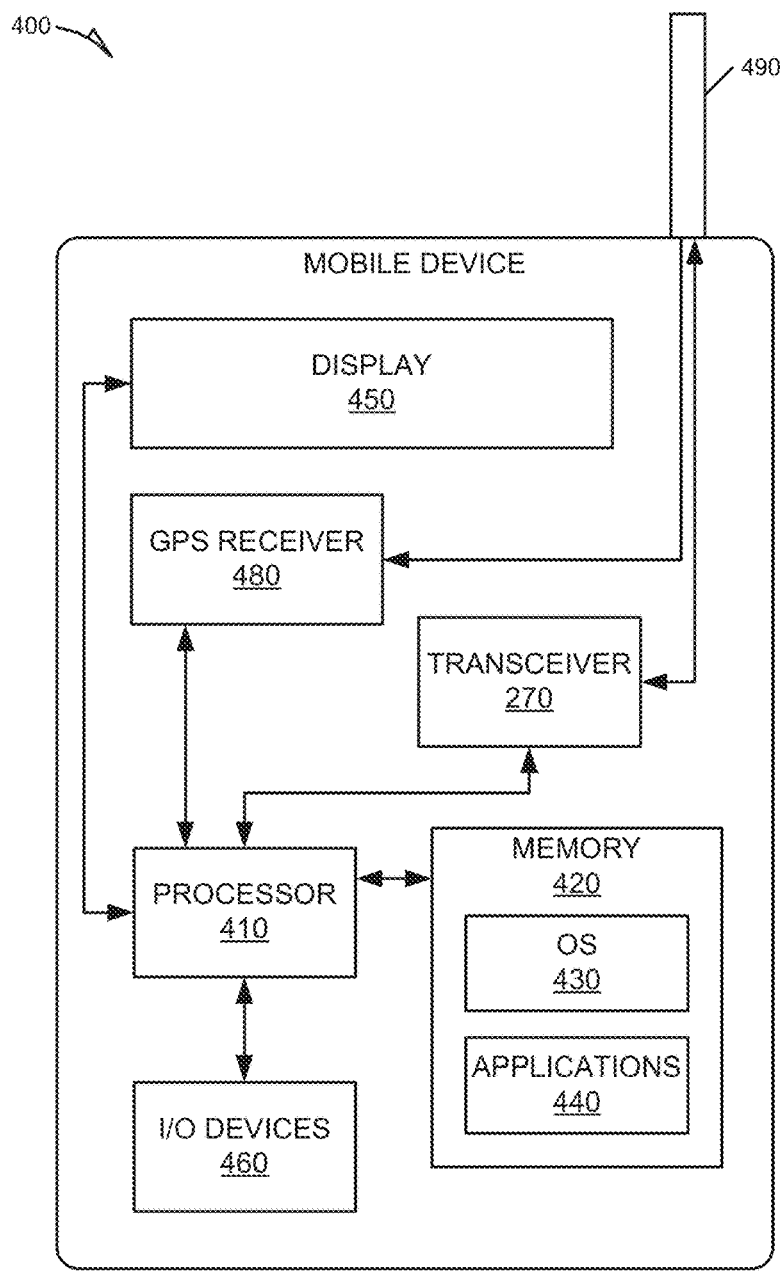
FIG. 4 is a block diagram illustrating a mobile device, according to an example embodiment.

FIG. 4 is a block diagram illustrating the mobile device 400, according to an example embodiment. The device 400 may include a processor 410. The processor 410 may be any of a variety of different types of commercially available processors suitable for mobile devices, for example, an XScale architecture microprocessor, a Microprocessor without Interlocked Pipeline Stages (MIPS) architecture processor, or another type of processor. A memory 420, such as a Random Access Memory (RAM), a Flash memory, or other type of memory, is typically accessible to the processor. The memory 420 may be adapted to store an operating system (OS) 430, as well as application programs 440, such as a mobile location enabled application that may provide LBS's to a user. The processor 410 may be coupled, either directly or via appropriate intermediary hardware, to a display 450 and to one or more input/output (I/O) devices 460, such as a keypad, a touch panel sensor, a microphone, etc. Similarly, in some embodiments, the processor 410 may be coupled to a transceiver 470 that interfaces with an antenna 490. The transceiver 470 may be configured to both transmit and receive cellular network signals, wireless data signals, or other types of signals via the antenna 490, depending on the nature of the device 400. In this manner the connection 410 with the communication network 420 may be established. Further, in some configurations, a GPS receiver 480 may also make use of the antenna 490 to receive GPS signals.

Additional detail regarding providing and receiving location-based services can be found in U.S. Pat. No. 7,848,765, Titled "Location-Based Services," granted to Phillips et al. and assigned to Where, Inc. of Boston, Mass., which is hereby incorporated by reference.

Example Platform Architecture

Figure 5:
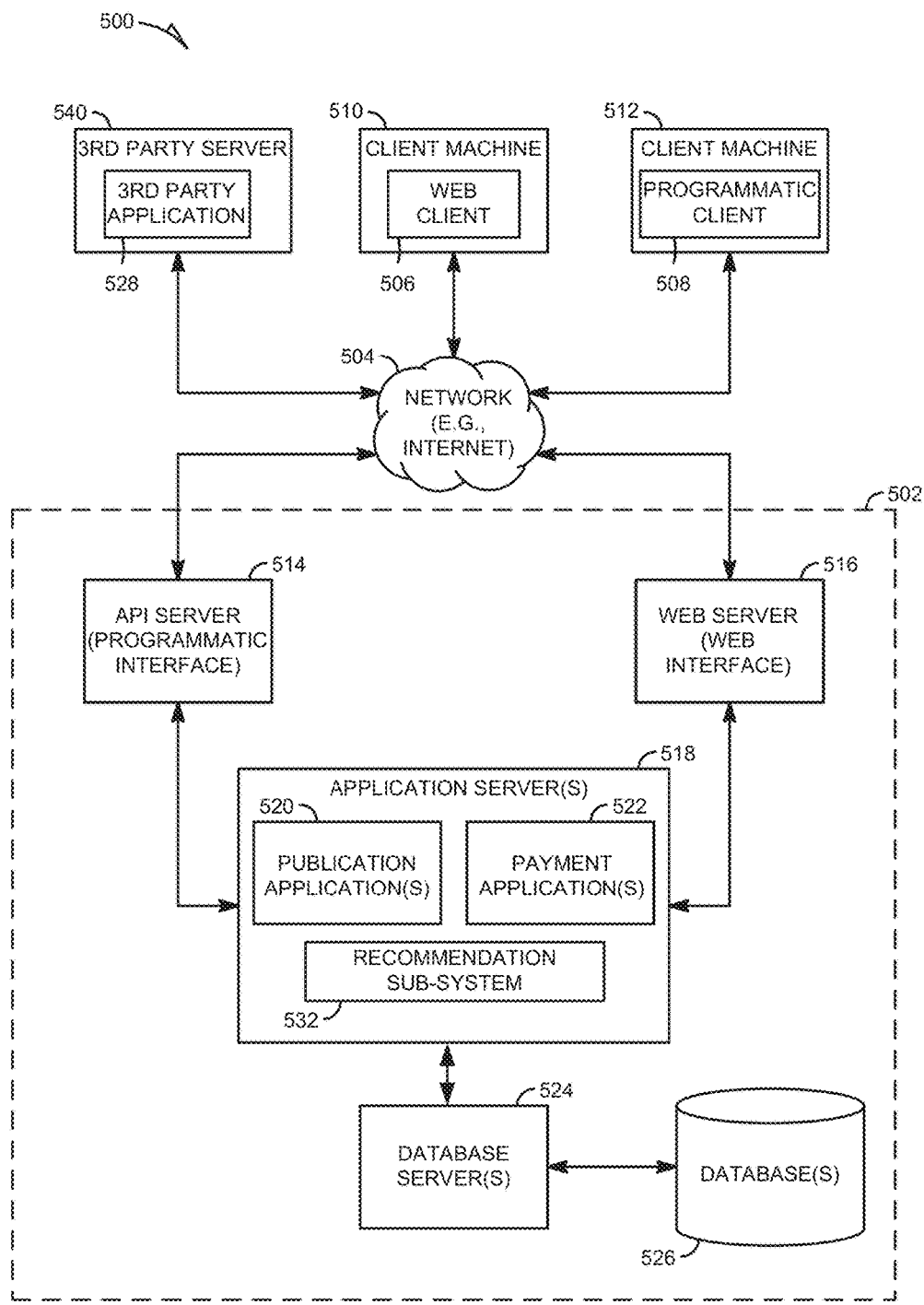
FIG. 5 is a block diagram illustrating a network-based system for delivering real-time location-aware recommendations and advertisements, according to an example embodiment.

FIG. 5 is a block diagram illustrating a network-based system 500 for delivering real-time location-aware recommendations and advertisements, according to an example embodiment. The block diagram depicting a client-server system 500, within which an example embodiment can be deployed is described. A networked system 502, in the example forms of a network-based location-aware recommendation, advertisement, or publication system, provides server-side functionality, via a network 504 (e.g., the Internet or Wide Area Network (WAN)) to one or more clients 510, 512. FIG. 5 illustrates, for example, a web client 506 (e.g., a browser, such as the Internet Explorer browser developed by Microsoft Corporation of Redmond, Wash. State), and a programmatic client 508 (e.g., WHERE smartphone application from Where, Inc. of Boston, Mass.) executing on respective client machines 510 and 512. In an example, the client machines 510 and 512 can be in the form of a mobile device, such as mobile device 400.

An Application Programming Interface (API) server 514 and a web server 516 are coupled to, and provide programmatic and web interfaces respectively to, one or more application servers 518. The application servers 518 host one or more publication applications 520 (in certain examples these can also include commerce applications, advertising applications, and marketplace applications, to name a few), payment applications 522, and a recommendation sub-system 532. The application servers 518 are, in turn, shown to be coupled to one or more database servers 524 that facilitate access to one or more databases 526. In some examples, the application server 518 can access the databases 526 directly without the need for a database server 524.

The publication applications 520 may provide a number of publication functions and services to users that access the networked system 502. The payment applications 522 may likewise provide a number of payment services and functions to users. The payment applications 522 may allow users to accumulate value (e.g., in a commercial currency, such as the U.S. dollar, or a proprietary currency, such as "points") in accounts, and then later to redeem the accumulated value for products (e.g., goods or services) that are advertised or made available via the various publication applications 520. The payment application 522 may also be configured to present recommendations, generated by the recommendation sub-system 532, to a user during checkout. The recommendation sub-system 532 may provide real-time location-aware recommendations to users of the networked system 502. The recommendation sub-system 532 can be configured to use all of the various communication mechanisms provided by the networked system 502 to present recommendations to users. While the publication applications 520, payment applications 522, and recommendation sub-system 532 are shown in FIG. 5 to all form part of the networked system 502, it will be appreciated that, in alternative embodiments, the payment applications 522 may form part of a payment service that is separate and distinct from the networked system 502.

Further, while the system 500 shown in FIG. 5 employs a client-server architecture, the present invention is of course not limited to such an architecture, and could equally well find application in a distributed, or peer-to-peer, architecture system, for example. The various publication applications 520, payment applications 522, and recommendation sub-system 532 could also be implemented as standalone software programs, which do not necessarily have networking capabilities.

The web client 506 accesses the various publication applications 520, payment applications 522, and recommendation sub-system 532 via the web interface supported by the web server 516. Similarly, the programmatic client 508 accesses the various services and functions provided by the publication applications, payment applications, and recommendation sub-system 520, 522 and 532 via the programmatic interface provided by the API server 514. The programmatic client 508 may, for example, be a local recommendation smartphone application (e.g., the WHERE application developed by Where, Inc., of Boston, Mass.) to enable users to receive real-time location-aware recommendations on their smartphones leveraging user profile data and current location information provided by the smartphone.

FIG. 5 also illustrates a third party application 528, executing on a third party server machine 530, as having programmatic access to the networked system 502 via the programmatic interface provided by the API server 514. For example, the third party application 528 may, utilizing information retrieved from the networked system 502, support one or more features or functions on a website hosted by the third party. The third party website may, for example, provide one or more promotional, marketplace or payment functions that are supported by the relevant applications of the networked system 502. Additionally, the third party website may provide user recommendations for items available on the networked system 502 through the recommendation sub-system 532. Additionally, the application server 518 may access advertisement data via a third party system, such as the third art server 540.

Example Recommendation Sub-System

Figure 6:
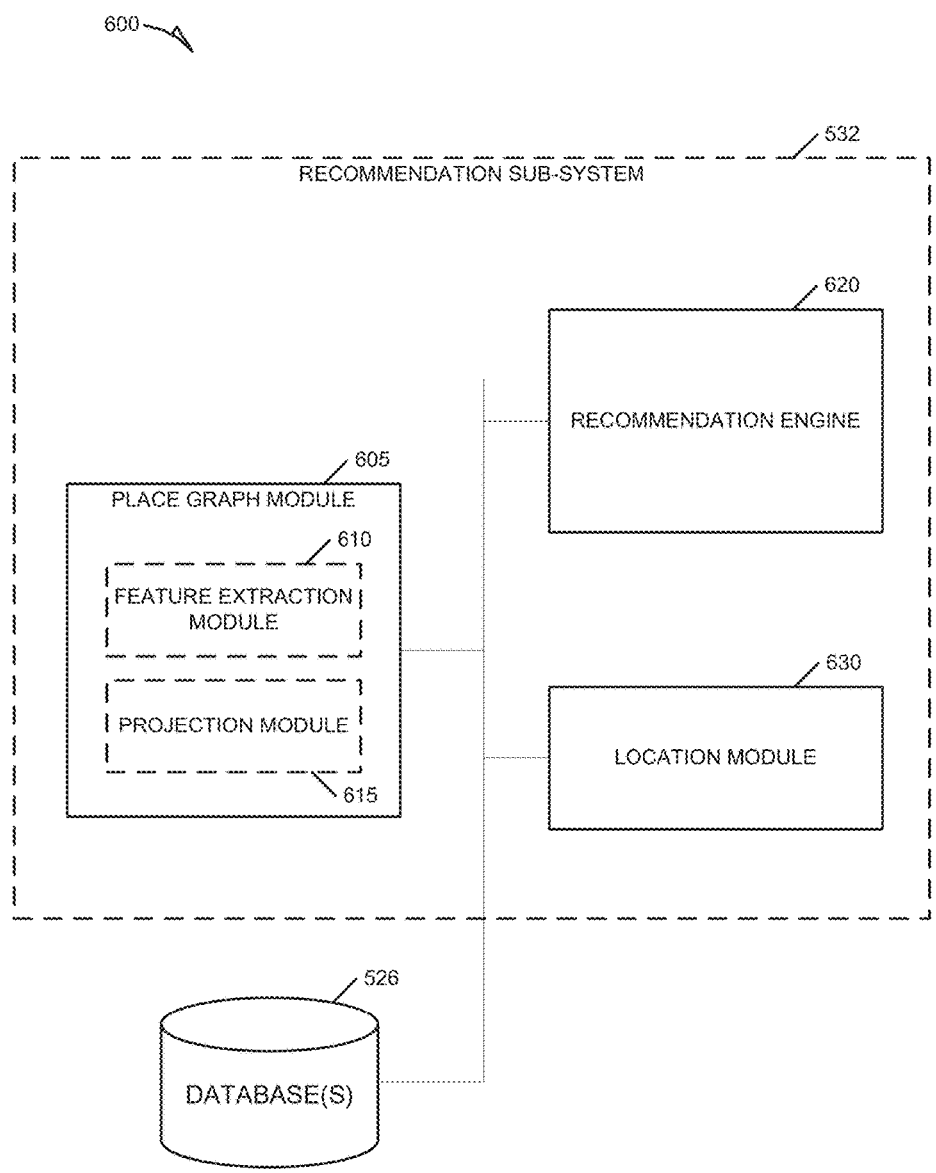
FIG. 6 is a block diagram illustrating an example recommendation sub-system capable of generating real-time location-aware recommendations, according to an example embodiment.

FIG. 6 is a block diagram illustrating an example recommendation sub-system 532 capable of generating real-time location-aware recommendations, according to an example embodiment. In this example, the recommendation sub-system 532 can include a place graph module 605, a location module 630, and a recommendation engine 620. In some examples, the place graph module 605 can include a feature extraction module 610 and a projection module 615. In this example, the recommendation sub-system 532 can access database 526 to store and/or retrieve user profile data as well as information about local places also referred to as location data).

In an example, the place graph module 605 can generate a place graph for the current location based on user profile data and location data. In some examples, the location data can be provided by the location module 630. In certain examples, the place graph module 605 includes a feature extraction module 610 that can invoke algorithms, such as PCA and SVD, to extract a feature matrix for a first plurality of places that have interactions associated with them in the user profile data. The feature extraction module 610 can also use both explicit and implicit user interactions associated the plurality of places to score each of the extracted features. See FIG. 9 for a table illustrating an example feature matrix for a plurality of places. The explicit and implicit user interaction data can be stored within the user profile data. The projection module 615 can project the feature matrix onto a second plurality of places provided by the location module 630. In some examples, the second plurality of places is derived from a different geographic location that does not necessarily include any places in common with the first plurality of places. In an example, the projection module 615 can use a spatial search (e.g., center point and radius) around a current location to filter places around a user based on the new places feature values. In this example, the filter will show only places that have feature values similar to the feature values within the feature matrix derived from the user profile data. Finally, the recommendation engine 620 can use the output of the place graph module 605 to produce a location-aware recommendation for a particular user in a particular location. In certain examples, the recommendation engine 620 maintains a list of recommended places for a particular user in a particular location. The recommendation sub-system 532 can continually update the list of recommended places as the user moves from location to location throughout the day.

Figure 7:
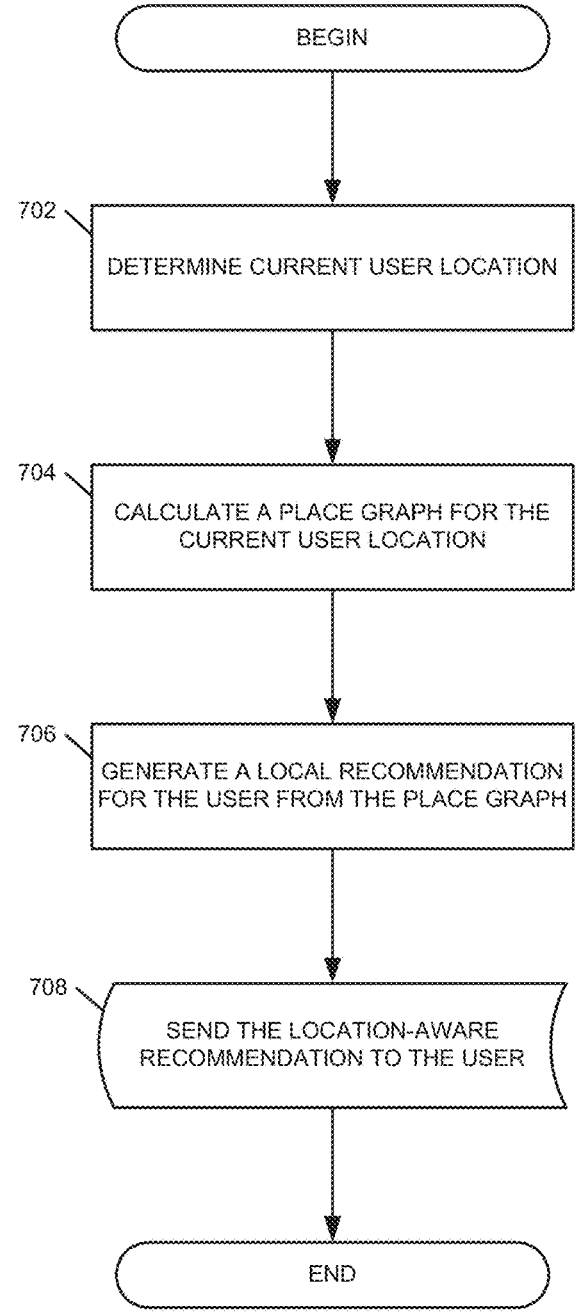
FIG. 7 is a flowchart illustrating an example method for generating real-time location-aware recommendations.
Figure 8:
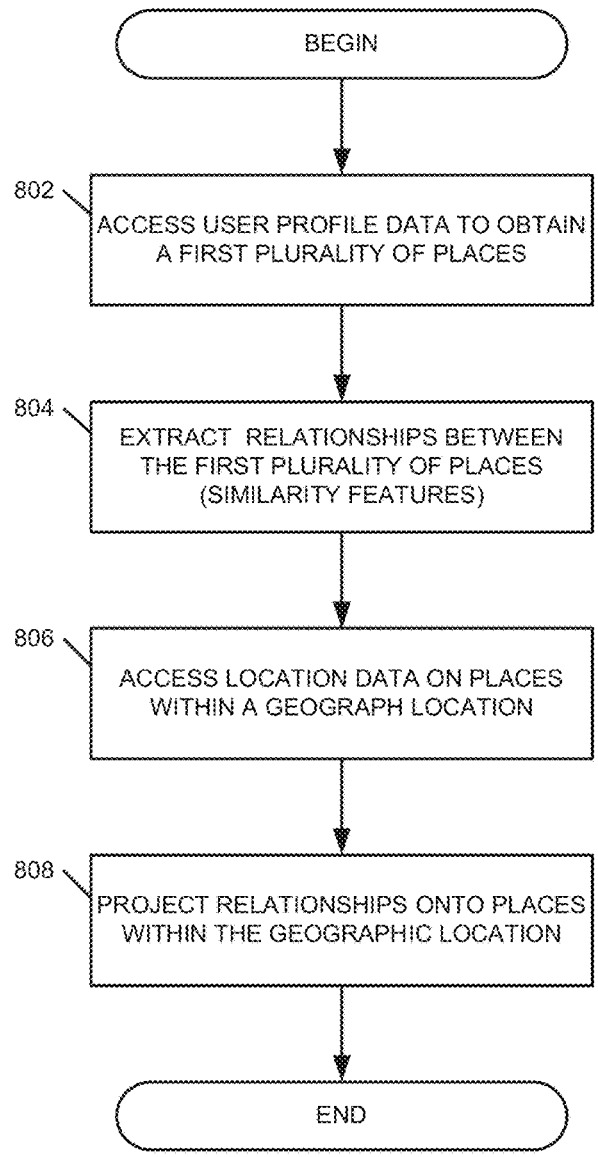
FIG. 8 is a flowchart illustrating a method for generating a place graph for a second geographical location, according to an example embodiment.

Additional details regarding the functionality provided by the recommendation sub-system 532 are detailed in reference to FIGS. 7-8.

Example Recommendation Methods

FIG. 7 is a flowchart illustrating an example method 700 for generating real-time location-aware recommendations. In this example, the method 700 can include operations for determining a current user location 702, calculating a place graph for the current user location 704, generating a local recommendation 705, and sending the location-aware recommendation to the user 708.

In this example, the method 700 can begin at 702 with the application server 518 receiving from a client, such as client 512, location data. In an example, the client 512 is a mobile device, such as mobile device 400, and can provide GPS location data obtained from the GPS receiver 480. At 704, the method 700 can continue with the recommendation sub-system 532 calculating a place graph for the current user location. In an example, the place graph can include a scored feature matrix see FIG. 9) projected onto a plurality of places in the current user location. In an example, the location module 620 can provide the plurality of places to the projection module 615 and the projection module 615 can generate the place graph.

At 706, the method 700 can continue with the recommendation engine 620 generating a local recommendation from the place graph produced by the place graph module 605. The recommendation engine 620 can generate the local recommendation by traversing the place graph and extracting places with strong correlation to places within the user's user profile data. Finally, at 708, the method 700 can conclude with the recommendation sub-system 532 transmitting the location-aware recommendation, via communication channels maintained by the application server 518, to a client device 512.

FIG. 8 is a flowchart illustrating a method 704 for calculating a place graph for a second geographical location, according to an example embodiment. In this example, the method 704 can include operations for accessing user profile data 802, extracting relationships (e.g., features) 804, accessing location data 806, and projecting the relationships (e.g., features) onto places within a geographic location 808.

In this example, the method 704 can begin with the place graph module 605 accessing user profile data to obtain user interaction data associated with a first plurality of places. The user interaction data associated with the first plurality of places can include both explicit and implicit interaction data. As discussed above, explicit interaction data explicitly indicates a user's preference regarding a place (or some aspect of the place). For example, the user can save a place to a favorites list, thus explicitly indicating that the user likes the place. The user could also write a review or take a survey that explicitly indicates that the user likes the deserts at this particular place. Implicit interactions, as discussed above, indirectly indicate a user's interest in a particular place. For example, if a user has viewed a detail page for a place multiple times, the system may infer that the user is interested in the location. As noted above, implicit interactions are weighted or scored differently than explicit interactions.

At 804, the method 704 can continue with the feature extraction module 610 extracting relationships between, or features associated with, the first plurality of places. In some examples, the extracted features are scored according to the user's explicit and implicit interactions. The extracted, and scored, features can create a feature matrix used to describe (or represent) a user's preferences. In an example, each user action has a code and a value. When a user performs an action in association with a place (e.g., user 120 has performed action 4 on place 2345), the code and value associated with the action result in a score associated with the place ID and user ID. This information is feed into a matrix that can be feed into the SVD algorithm for feature extraction. At 806, the method 704 continues with the location module 620 accessing location data, from the database 526, for a second plurality of places within the current geographic location (e.g., the location received at operation 702). Finally, the method 700 can conclude at 808 with the projection module 615 projecting the feature matrix (e.g., extracted relationships between the first plurality of places) onto the second plurality of places within the geographic location indicated by the current user location. In this example, the place graph generated by method 704 can then be used to generate location-aware recommendations for the user in a new geographic location (e.g., a location in which the user has not interacted with any places).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
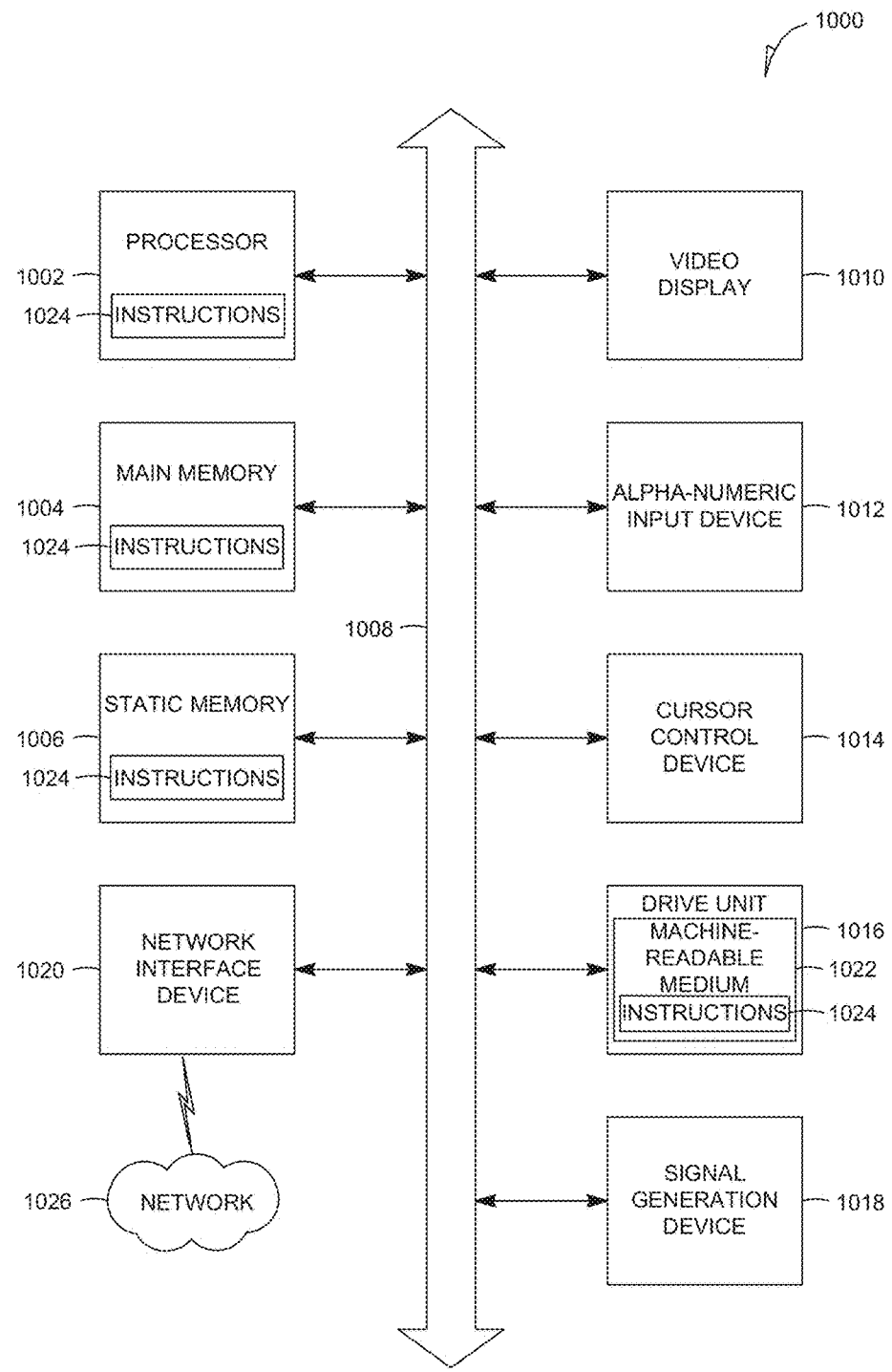
FIG. 10 is a diagrammatic representation of a machine in the example form of a computer system within which a set of instructions for causing the machine to perform any one or more of the methodologies discussed herein may be executed.

FIG. 10 is a block diagram of machine in the example form of a computer system 1000 within which instructions, for causing the machine to perform any one or more of the methodologies discussed herein, may be executed, in alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or used by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only-Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network. ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for making contextual recommendations to users on a network-based marketplace have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." in this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The claimed invention is:

1. A method for generating location-aware recommendations, the method comprising:
   receiving a search request that includes location data that identifies a current location of a user device;
   accessing user profile data for the user, the user profile data including a user interaction history of the user, the user interaction history comprising at least an explicit user input and an implicit user input, the explicit user input including at least a request to promote a place from among a first plurality of places, and the implicit user input including at least an indication that the user visited a web-site associated with the place from among the first plurality of places;
   extracting a first set of features from the first plurality of places, the first set of features including attributes of the first plurality of places;
   assigning a feature value to each feature among the first set of features, the feature value being based on the implicit user input and the explicit user input of the user, the assigning the feature value to each feature among the first set of features includes applying a first weighting factor to the explicit user input regarding the one or more of the first plurality of places, and a second weighting factor to the implicit input regarding the one or more of the first plurality of places;
   generating a feature matrix of the user based on the feature value of each feature among the first set of features;
   identifying a second plurality of places within a radius of the current location, the second plurality of places having a second set of features;
   generating a place graph of the user, the generating the place graph including projecting the feature matrix of the user onto the second set of features of the second plurality of places;
   identifying a place recommendation from among the second plurality of places based on the place graph that includes the feature value from the feature matrix; and
   communicating the place recommendation to the user.

2. The method of claim 1, wherein the explicit user input includes ratings of each of the first plurality of places from the user.

3. The method of claim 1, wherein the assigning the feature value to each feature among the first set of features based on explicit user input includes scoring the features based on one or more of the following explicit inputs:
   a user supplied rating;
   a review;
   a related check-in; or
   a user saving a place into an address book.

4. The method of claim 1, wherein the identifying the place recommendation includes filtering the one or more potential place recommendations based on time of day.

5. A system comprising:
   one or more processors; and
   a memory storing instructions that, when executed by at least one processor among the one or more processors, causes the system to perform operations comprising:
   receiving a search request that includes location data that identifies a current location of a user device;
   accessing user profile data for the user, the user profile data including a user interaction history of the user, the user interaction history comprising at least an explicit user input and an implicit user input, the explicit user input including at least a request to promote a place from among a first plurality of places, and the implicit user input including at least an indication that the user visited a web-site associated with the place from among the first plurality of places;
   extracting a first set of features from the first plurality of places, the first set of features including attributes of the first plurality of places;
   assigning a feature value to each feature among the first set of features, the feature value based on the implicit user input and the explicit user input of the user, the assigning the feature value to each feature among the first set of features includes applying a first weighting factor to the explicit user input regarding the one or more of the first plurality of places, and a second weighting factor to the implicit input regarding the one or more of the first plurality of places;
   generating a feature matrix of the user based on the feature value of each feature among the first set of features;
   identifying a second plurality of places within a radius of the current location, the second plurality of places having a second set of features;

generating a place graph of the user, the generating the place graph including projecting the feature matrix of the user onto the second set of features of the second plurality of places;

identifying a place recommendation from among the second plurality of places based on the place graph that includes the feature value from the feature matrix; and communicating the place recommendation to the user.

6. The system of claim 5, wherein the explicit user input includes ratings of each of the first plurality of places from the user.

7. A non-transitory machine-readable storage medium containing instructions that, when executed by at least one processor of a machine, cause the machine to perform operations comprising:

receiving a search request that includes location data that identifies a current location of a user device;

accessing user profile data for the user, the user profile data including a user interaction history of the user, the user interaction history comprising at least an explicit user input and an implicit user input, the explicit user input including at least a request to promote a place from among a first plurality of places, and the implicit user input including at least an indication that the user visited a web-site associated with the place from among the first plurality of places;

extracting a first set of features from the first plurality of places, the first set of features including attributes of the first plurality of places;

assigning a feature value to each feature among the first set of features, the feature value based on the implicit user input and the explicit user input of the user, the assigning the feature value to each feature among the first set of features includes applying a first weighting factor to the explicit user input regarding the one or more of the first plurality of places, and a second weighting factor to the implicit input regarding the one or more of the first plurality of places;

generating a feature matrix of the user based on the feature value of each feature among the first set of features;

identifying a second plurality of places within a radius of the current location, the second plurality of places having a second set of features;

generating a place graph of the user, the generating the place graph including projecting the feature matrix of the user onto the second set of features of the second plurality of places;

identifying a place recommendation from among the second plurality of places based on the place graph that includes the feature value from the feature matrix; and communicating the place recommendation to the user.

* * * * *